United States Patent
Johnson et al.

(10) Patent No.: US 11,140,274 B2
(45) Date of Patent: *Oct. 5, 2021

(54) PAIR-THE-PLAN SYSTEM FOR DEVICES AND METHOD OF USE

(71) Applicant: Aeris Communications, Inc., Santa Clara, CA (US)

(72) Inventors: Drew S. Johnson, San Jose, CA (US); Robert B. Fultz, Boulder Creek, CA (US); Steven A. Millstein, Dallas, TX (US); Dae Seong Kim, Campbell, CA (US); John Molise, Menlo Park, CA (US)

(73) Assignee: Aeris Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/599,835

(22) Filed: May 19, 2017

(65) Prior Publication Data

US 2017/0257491 A1    Sep. 7, 2017

Related U.S. Application Data

(63) Continuation of application No. 14/274,505, filed on May 9, 2014, now Pat. No. 9,667,806.

(Continued)

(51) Int. Cl.
*H04M 15/00* (2006.01)
*H04W 4/90* (2018.01)
(Continued)

(52) U.S. Cl.
CPC .... *H04M 15/7652* (2013.01); *H04L 12/1457* (2013.01); *H04L 12/1471* (2013.01);
(Continued)

(58) Field of Classification Search
CPC ............. H04M 15/7652; H04M 15/60; H04L 12/1457
(Continued)

(56) References Cited

U.S. PATENT DOCUMENTS

| 6,195,568 | B1 | 2/2001 | Irvin | |
|---|---|---|---|---|
| 8,805,441 | B1 * | 8/2014 | Nasserbakht | G06F 16/951 |
| | | | | 455/556.1 |

(Continued)

OTHER PUBLICATIONS

PCT International Search Report and Written Opinion of the International Searching Authority, dated Jan. 21, 2015, application No. PCT/US2014/060748.

*Primary Examiner* — Nghi H Ly
(74) *Attorney, Agent, or Firm* — Brundidge & Stanger, P.C.

(57) ABSTRACT

A method and system are disclosed for connecting a device to subscriptions and cellular billing plans of separate users and for managing the concurrent use of the device by the separate users. A computer-implemented method comprises enrolling a device in a cellular subscription and billing plan of a user. The enrollment includes providing an identifier for the device to a cellular subscription, effectively adding the device to the cellular subscription and billing plan selected by the user. The method and system allows the user to use capabilities of the device as governed by the cellular subscription and an associated billing plan as selected by that user, while the device is also available for use by another user via another cellular billing plan, as selected by that user.

7 Claims, 12 Drawing Sheets

Related U.S. Application Data

(60) Provisional application No. 61/893,055, filed on Oct. 18, 2013.

(51) Int. Cl.
  *H04W 4/44* (2018.01)
  *H04L 12/14* (2006.01)
  *H04W 4/24* (2018.01)

(52) U.S. Cl.
  CPC ......... *H04M 15/60* (2013.01); *H04M 15/745* (2013.01); *H04M 15/765* (2013.01); *H04W 4/24* (2013.01); *H04W 4/44* (2018.02); *H04W 4/90* (2018.02)

(58) Field of Classification Search
  USPC .......................... 455/414.1, 406, 418, 422.1
  See application file for complete search history.

(56) References Cited

U.S. PATENT DOCUMENTS

| | | | |
|---|---|---|---|
| 9,667,806 B2* | 5/2017 | Johnson | H04W 4/90 |
| 2008/0274715 A1* | 11/2008 | Heit | H04M 15/00 |
| | | | 455/406 |
| 2010/0131385 A1* | 5/2010 | Harrang | G06Q 30/00 |
| | | | 705/26.1 |
| 2010/0234071 A1 | 9/2010 | Shabtay et al. | |
| 2012/0046024 A1* | 2/2012 | Mikan | H04M 15/8351 |
| | | | 455/420 |
| 2012/0088544 A1 | 4/2012 | Bentley | |
| 2012/0142367 A1 | 6/2012 | Przybylski | |
| 2013/0226682 A1* | 8/2013 | Grossman | G06Q 30/02 |
| | | | 705/14.23 |
| 2013/0262275 A1* | 10/2013 | Outwater | G06Q 10/02 |
| | | | 705/27.1 |
| 2013/0336637 A1* | 12/2013 | Nakamura | H04N 5/783 |
| | | | 386/262 |
| 2014/0032294 A1* | 1/2014 | Donlan | G06Q 30/0224 |
| | | | 705/14.17 |
| 2014/0322294 A1 | 1/2014 | Donlan et al. | |

* cited by examiner

PAIR-THE-PLAN SYSTEM FOR DEVICES AND METHOD OF USE

CROSS-REFERENCE TO RELATED APPLICATIONS

This application is a Continuation of U.S. Ser. No. 14/274,505, filed May 9, 2014; which claims priority to U.S. provisional application Ser. No. 61/893,055, filed on Oct. 18, 2013, the entire contents of which are hereby incorporated by reference.

FIELD OF THE INVENTION

The present invention relates generally to wireless services and more particularly to devices enabled for connectivity to cellular or other wireless service and having more than one primary purpose and user.

BACKGROUND

There are many types of devices that are enabled for connectivity to cellular or other wireless services and that can fulfill multiple purposes. One example is a vehicle with cellular connectivity; the vehicle Original Equipment Manufacturer (OEM) may enable this connectivity in the vehicle principally for the purpose of collecting data from the vehicle related to vehicle performance. At the same time, the connectivity could have other purposes, such as delivering information/entertainment (infotainment) content according to the preferences of the consumer using the vehicle (such as an owner, lessee or renter, referred to here for convenience as the "vehicle owner"), or allowing an insurance company to collect information about driving habits in order to offer discounts for those who drive safely. In the example for infotainment, vehicle owners would probably not be willing to fund the cellular connectivity for the OEM to collect data from the vehicle related to vehicle performance. Similarly, OEMs would probably not fund the cellular connectivity for vehicle owner's access to infotainment or other data-intensive applications.

Another example of such a device is a tablet (e.g. Kindle Fire™) which may be used to purchase and download content from a primary provider (e.g. Amazon). The content provider for the tablet (referred to for convenience as "the tablet content provider") benefits from such purchases and therefore is willing to fund the connectivity as part of that purchase. However, the tablet can also be used by the person using the tablet (referred to here for convenience as the "tablet owner") to access other content which is not provided by the tablet content provider, and the tablet content provider may prefer not to fund the cellular connectivity for this other content accessed by the tablet owner. As connectivity to cellular and other wireless services is not free, it is desirable to separate the cost and control of the connectivity depending on the user, directing traffic to the appropriate user's service provider and subscription and billing plan.

Accordingly, what are needed are systems and methods to address the above identified issues. The present invention addresses such a need.

SUMMARY

A method and system are disclosed for connecting a device to a subscription and cellular billing plan of a user. A computer-implemented method comprises enrolling a device in a cellular subscription and billing plan of a user. The enrollment includes providing an identifier for the device to a cellular subscription, effectively adding the device to the cellular subscription and billing plan selected by the user. The method and system allows the user to use capabilities of the device as governed by the cellular subscription and an associated billing plan as selected by that user, while the device is also available for use by another user via another cellular billing plan, as selected by that user. By this means, the device is available to different users for the purpose of their interest, but such usage is handled and billed separately through connections to the subscriptions and billing plans each user has with its chosen service provider.

DETAILED DESCRIPTION

Figure 1:
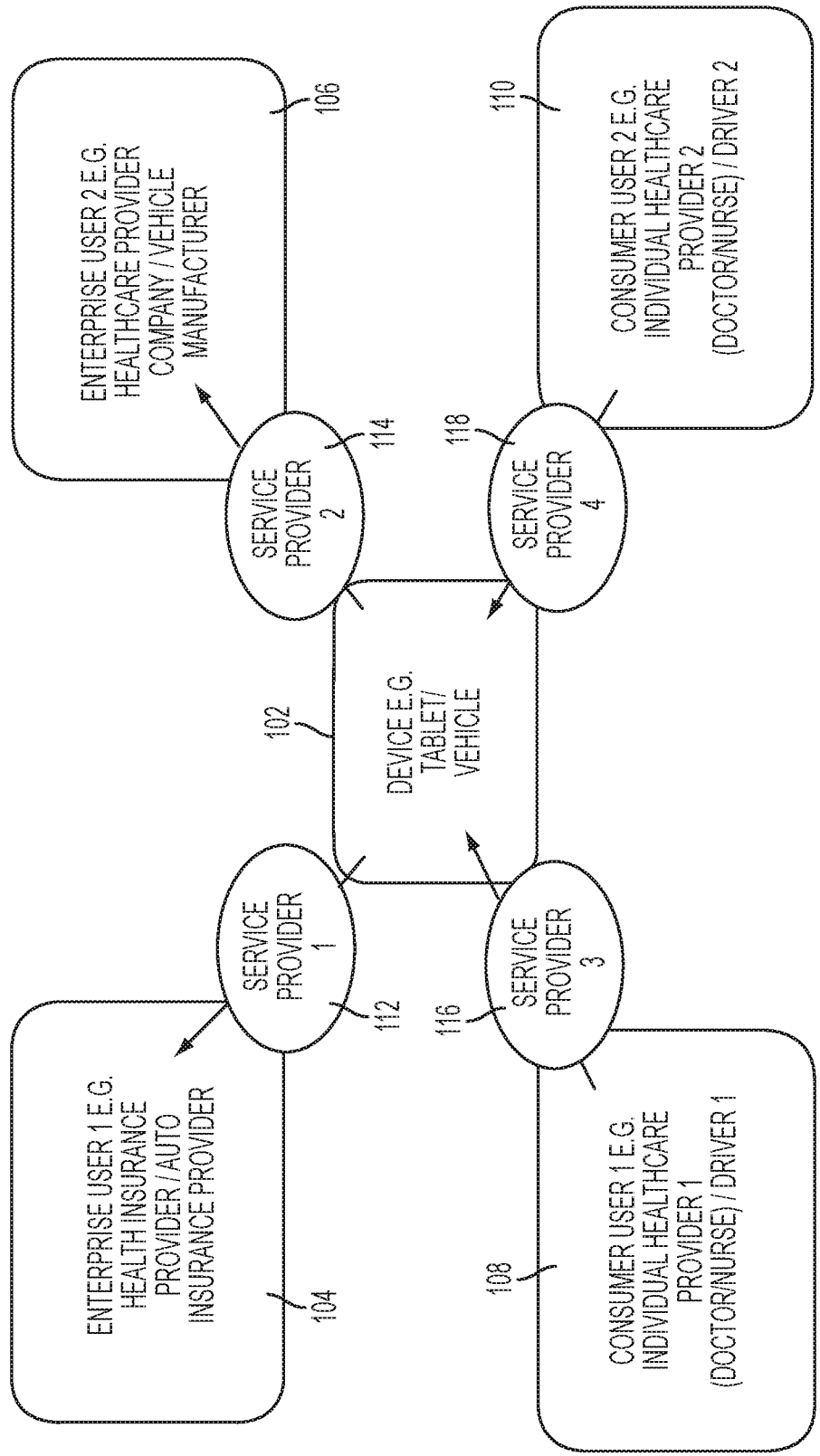
FIG. 1 illustrates a tablet or a vehicle environment with multiple users using multiple subscription plans in accordance with an embodiment.

The present invention relates generally to wireless services and more particularly to devices enabled for connectivity to cellular or other wireless service and having more than one primary purpose and user. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A multi-purpose device can be defined as a device which can be used for more than one purpose by one or more users where the purposes and the users benefiting from the use may or may not be related to each other. In an embodiment, a multi-purpose device communicates with a cellular or other wireless service provider for one of its purposes to benefit one of its users and is capable of receiving and transmitting information over the provider's network. In addition, the device can be used for another purpose benefiting the same or a different user also involving communication with the same or a different provider of cellular or other wireless services. The device could be an embedded mobile device such as a telematics unit in a vehicle, a tablet, a portable computer or any portable device that has multiple purposes requiring the use of a cellular or other wireless network, either generally or in a closed environment (such as a hospital, office building or hotel).

In an embodiment, a multi-purpose device has an enterprise user (an enterprise stakeholder) and a consumer user (a consumer stakeholder). The multi-purpose device utilizes a particular cellular or other wireless provider for enterprise applications and purposes and such usage is controlled and billed by the rules of the billing plan that the enterprise user has with the provider chosen by the enterprise user. Notwithstanding this association between the device and the provider and billing subscription of the enterprise user, the device can also be paired with a subscription and billing plan available to the consumer through a provider chosen by the consumer when used for applications and purposes selected by the consumer. For these consumer-oriented uses, the multi-purpose device could be enrolled in the same billing plan (or in a new billing plan), and billed in the same manner, as any other cellular or wireless device used by that consumer and have access to one or more services (such as voice, data or SMS) available from the provider chosen by the consumer and supported by the consumer's subscription and the technical capabilities of the device. These services can be used to access such consumer-oriented uses as voice calls, messaging and address books and other data services as well as infotainment (content or programming that combines information-based uses with entertainment), whether available generally to all wireless-enabled devices or using specialized hardware/software products and systems which are built into, or can be added to, devices, for example vehicle systems designed to enhance the user experience.

In another example, a multi-purpose device could be provided by a hospital, office building, manufacturing plant, hotel, or other provider for a particular business need such as health monitoring, but could also be used to allow the current user to access other content. In each case described, a single device has more than one purpose and more than one user or stakeholder. Stakeholders can be enterprises or consumers.

FIG. 1 illustrates an embodiment where a device such as a vehicle's telematics unit or a tablet reader is enrolled in one or more billing plans chosen by one or more enterprises and, at the same time, is enrolled in one or more billing plans chosen by one or more consumers. Enterprise1 104 is an enterprise stakeholder such as an automobile insurance provider interested in tracking driving habits of one or more drivers. Enterprise1 104 enrolls device 102 in the service provider subscription plan 112 selected by enterprise1 104. Similarly, enterprise2 106, another enterprise stakeholder, such as a vehicle OEM interested in tracking vehicle and vehicle systems performance, enrolls device 102 in the service provider subscription plan 114 selected by enterprise2 106. When consumer1 108, as a consumer stakeholder, uses device 102 for his/her own purpose such as infotainment, he/she would like to use his/her own subscription plan 116. Hence, consumer1 108 would enroll device 102 in the service provider subscription plan 116 selected by consumer1 108. Similarly, when consumer2 110, as another consumer stakeholder, uses device 102 for his/her own purpose such as infotainment, he/she would like to use his/her own subscription plan 118. Hence, consumer2 110 would enroll device 102 in the service provider subscription plan 118 selected by consumer2 110.

Although there are many environments in which use of a multi-purpose device would be advantageous, a significant use case is the automotive industry. Typically, in an automotive environment, a telematics unit within a vehicle (often "under the hood" and not visible to the person operating the vehicle) is used for communication. Automotive OEMs or manufacturers of vehicle audio systems often allow for the audio device in the vehicle to be connected, or paired, with the smart phone or other cellular-connected device (the "brought in phone", or BIP) of the consumer, such as vehicle owner or other user (a lessee of the vehicle or a passenger in the vehicle) as a way to economically provide infotainment services such as streaming audio in the vehicle, bypassing the telematics unit and ensuring that the cost of use remains with the consumer.

The BIP solution requires complex pairing of the smartphone with the vehicle devices and systems. For pairing to work at all, the BIP must be connected to the vehicle devices, so both BIP and vehicle devices must support compatible connectivity methods. For the consumer services to work correctly in a specific driving session, the BIP must be present and have sufficient battery, and the pairing must be refreshed, which does not always happen automatically. In addition, there is no standardization about where the system controls for the consumer services will be presented (on a screen on the vehicle device or on the screen of the BIP), which can lead to difficulties in operation and distracted driving issues. Furthermore, the BIP and the vehicle systems must support compatible infotainment application software. These capabilities must work across the range of consumer device manufacturers, operating systems, and applications. Finally, since vehicles typically have lifespans of ten years or more, the vehicle device must be able to pair with BIP devices that do not exist today or at the time of the design of the vehicle's systems, but will exist at a date sometime in the future. In practice, it is documented that consumers who upgrade smartphones and other connected devices frequently experience issues pairing their BIP devices with vehicle devices. Compatibility issues and difficulty of use drive consumer and safety complaints about most BIP systems.

Vehicle original equipment manufacturers (OEMs) are increasingly including embedded cellular connectivity in vehicles for the purposes of monitoring and managing the vehicle and its component systems. While these systems could be configured to allow use for consumer-oriented services, and consumers would want to use the embedded connectivity if it were available, neither the OEM nor the consumers want to pay for the cellular connectivity used for the other party's purposes (monitoring and managing the vehicle and its component systems for the OEM, infotainment or other "front seat" services for the consumer). What is needed is a method for bypassing the BIP solution and allowing the consumer to use their existing cellular data plan with the automotive embedded device for consumer-oriented services. Such an invention will save total cost, improve service, safety and consumer satisfaction, reduce complexities arising out of technological change and simplify billing.

Allowing an embedded telematics device to be used for the purposes of the consumer and for the consumer to pay for that use according to consumer's own subscription plan is currently not possible because current technology requires that the embedded device be assigned to a single subscriber plan and wireless network, in this case the subscriber plan of the OEM and the OEM's cellular home network. These limitations are eliminated by the present invention, which addresses the mutual desires of OEMs and consumers to provide a safe, convenient way to enable dual use while assigning costs to the appropriate party through their own subscription plans.

To describe the features of the present invention in more detail within the context of the automotive industry, refer to the accompanying figures in conjunction with the following discussions. These examples are used for purpose of illustration only, and should not be construed as limitations.

Figure 2:
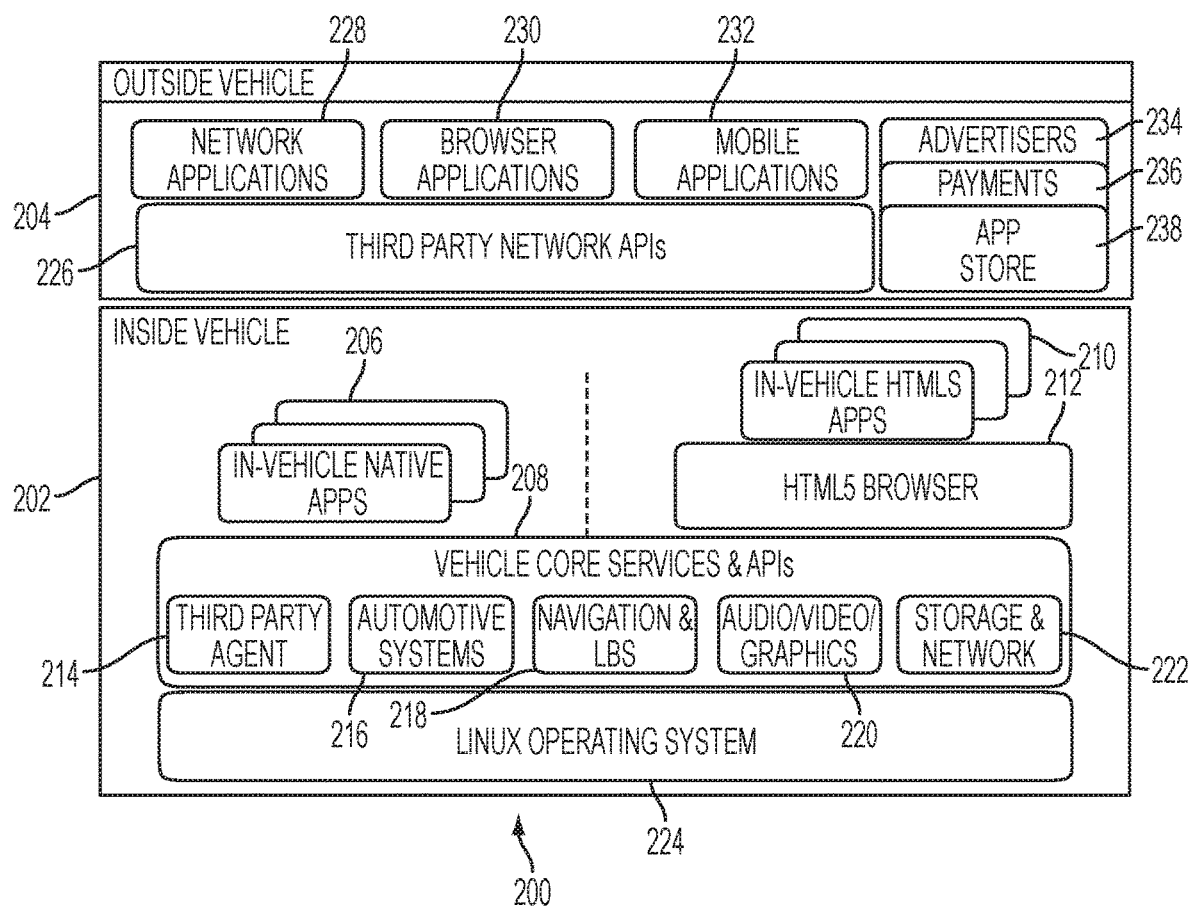
FIG. 2 illustrates a vehicle environment relating to a device with multiple purposes in accordance with an embodiment.

FIG. 2 is a diagram that illustrates applications and interfaces inside the vehicle 202 and outside the vehicle 204. Inside the vehicle comprise the applications that are running inside the vehicle. There are a variety of elements inside the vehicle that can be accessed through the applications running inside the vehicle. They include but are not limited to an operating system, for example a Linux-based operating system 224. In-vehicle native applications 206, in-vehicle Hyper Text Markup Language (HTML) applications 210 and its associated HTML browser 212, vehicle core service elements 208 all may also reside within the vehicle. The vehicle core elements could for example in an embodiment include a third party agent, 214, automotive systems 216, a navigation system 218, an audio graphic system 220 and storage and network elements 222.

Outside of the vehicle are network application programming interfaces (APIs) that reside outside the vehicle. FIG. 2 illustrates outside the vehicle applications, for example, third party network APIs 226 that interface with network applications 228, browser applications 230 and mobile applications 232. There are also advertisers 234, payment 236 and an application store 238.

These elements are utilized together to allow the vehicle OEM to choose a cellular network provider to act as interface between the vehicle OEM and the vehicle. This cellular network provider is referred to as "the OEM's carrier."

Figure 3:
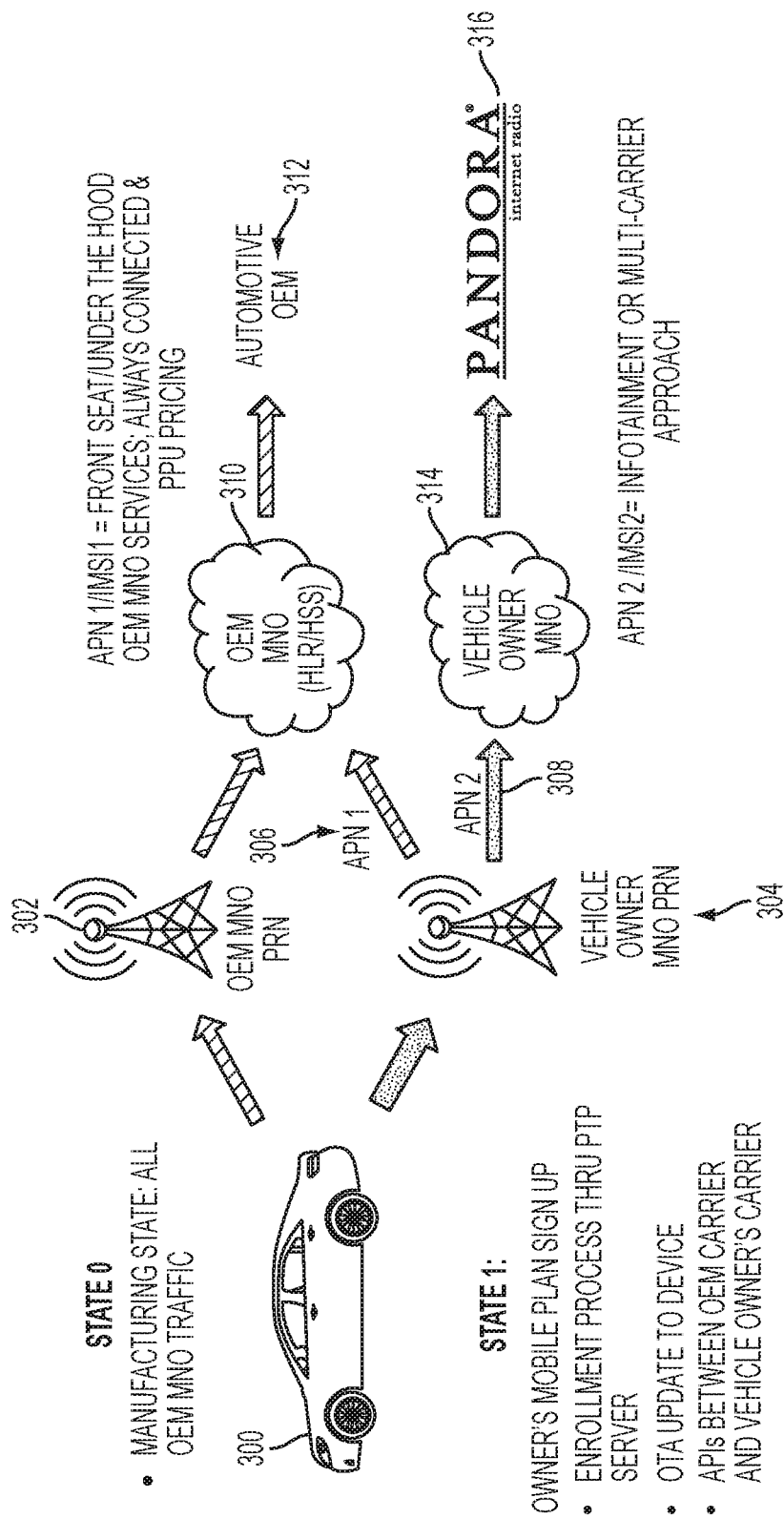
FIG. 3 is a diagram illustrating a system in which a device (in this case, a vehicle) would operate in accordance with an embodiment.

FIG. 3 is a diagram illustrating a system in which a device (in this case, a vehicle) would operate in accordance with an embodiment. The vehicle OEM 312 is always connected to the vehicle 300 via the OEM's carrier 302 in a manufacturing state, state0. When the vehicle 300 is purchased, a consumer, in this case owner of the vehicle, can enroll his or her vehicle 300 into his/her existing cellular plan as provided by his/her cellular network provider referred to as "the vehicle owner's carrier" 304.

After enrollment, as depicted by state1, the vehicle's behavior is changed so that 1) the vehicle 300 will connect to the consumer's carrier depicted by vehicle owner's mobile network operator's preferred radio network (vehicle owner MNO PRN) 304 rather than the OEM's carrier 302; and 2) two network traffic paths are established, one for the OEM's purposes, the other for the vehicle owner's. The first network traffic path is depicted by Access Point Name1 (APN1) 306. This path is directed to the OEM via the vehicle owner's carrier's radio access network (vehicle owner MNO) 304 and the OEM's carrier's core network home location register/home subscriber server (HLR/HSS) 310 to the vehicle manufacturer 312.

The interconnection between the vehicle owner's carrier 304 and the OEM's carrier 302 adheres to cellular network providers' interconnection standards. As a result, the vehicle OEM 312 is always connected to the vehicle 300. The second network traffic path is depicted by Access Point Name 2 (APN2) 308 provided to the vehicle owner's carrier 314 to access other, typically infotainment, services 316. Applications in the vehicle 300 can be mapped to either APN1 306 to allow billing directly to OEM's plan or to APN2 308 for billing to the vehicle owner's plan, depending on which stakeholder uses the application.

The implementation depicted in FIG. 3 involves the management and updating of the multi-purpose device's network parameters and resources such as the International Mobile Subscriber Identifier (IMSI) or Mobile Directory Number (MDN), and the device Preferred Roaming List (PRL) or public land mobile network (PLMN). For example, the vehicle owner's carrier 304 may assign a new international mobile subscriber identifier (IMSI) to the vehicle. The new IMSI assigned by the vehicle owner's carrier will be used for all future authentications and dataflow, and old IMSI assigned by the OEM's carrier 302 remains as a back-up for vehicle OEM to access the vehicle related data in case of loss of connection through the new carrier or suspension or termination of the vehicle owner's account with the new carrier.

The HLR or HSS 310 of the OEM's carrier 302 may be utilized, as an embodiment, to manage the network registrations and authorizations post-pairing as discussed below.

Figure 4A:
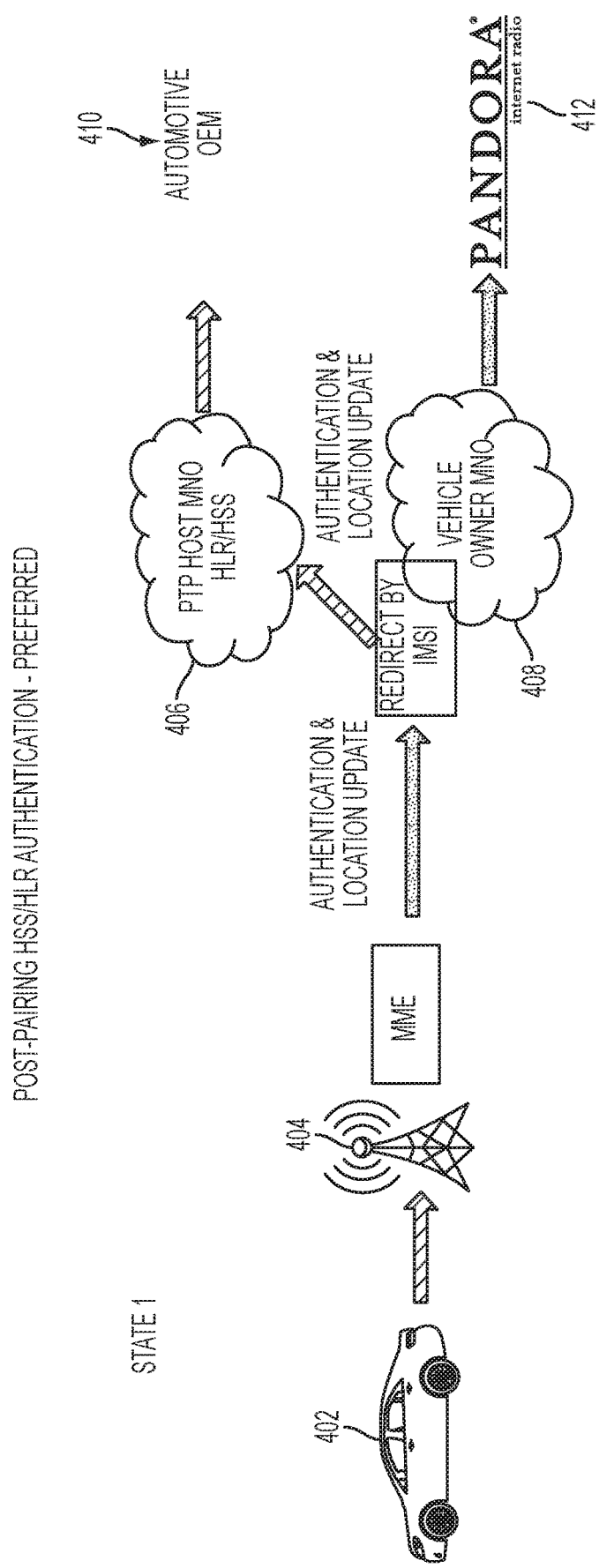
FIG. 4a illustrates management of network registrations and authorizations through different channels of communication post-pairing, in accordance with an embodiment of the present invention.
Figure 4B:
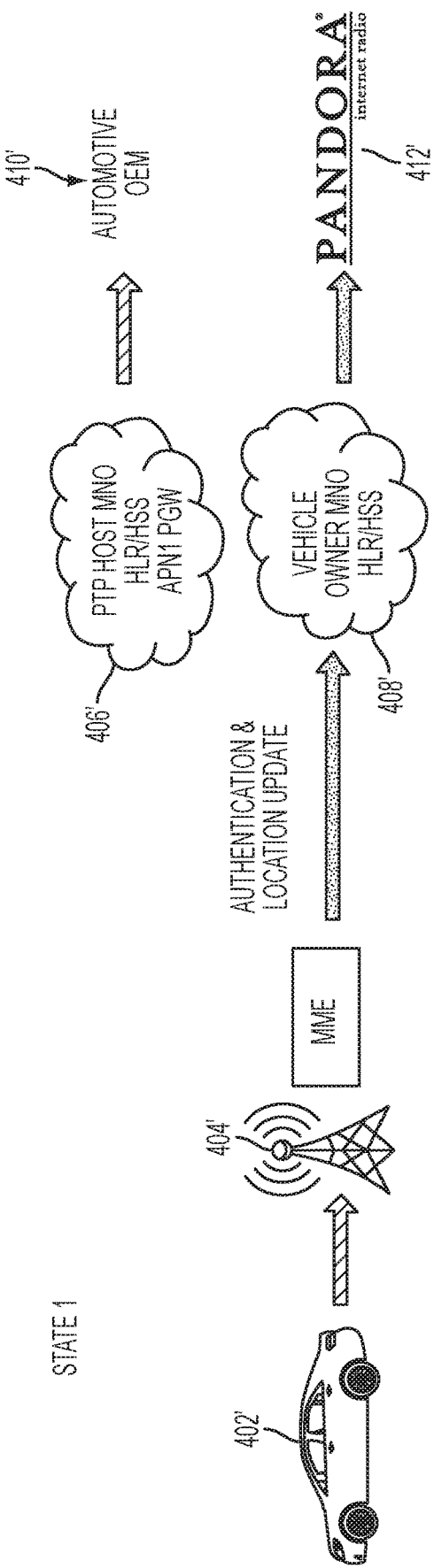
FIG. 4b illustrates management of network registrations and authorizations through different channels of communication post-pairing, in accordance with another embodiment of the present invention.

FIGS. 4a and 4b illustrate management of network registrations and authorizations through different channels of communication post-pairing. FIG. 4a illustrates a preferred embodiment where HSS/HLR is maintained by the "Pair The Plan" PTP host MNO 406 even after pairing, for example, authentication and location updates are done with PTP host MNO 406. This is accomplished by the vehicle owner MNO 408 redirecting the authentication and location update traffic toward the PTP host MNO 406 based on the IMSI. This continuing involvement of PTP host MNO 406 in managing data traffic provides various advantages such as maintaining any special features that the automotive OEM 410 requires to execute functionalities of interest to it and better enabling additional and/or subsequent pairings.

FIG. 4b illustrates another embodiment where management of network registrations and authorizations is transferred to the vehicle owner MNO 408' from PTP host MNO 406' post-pairing, for example, authentication and location updates are accomplished using vehicle owner MNO 408'. To describe an example of a pairing experience by both the consumer and the cellular plan provider in accordance with an embodiment refer now to the following description in conjunction with the accompanying figures.

Figure 5:
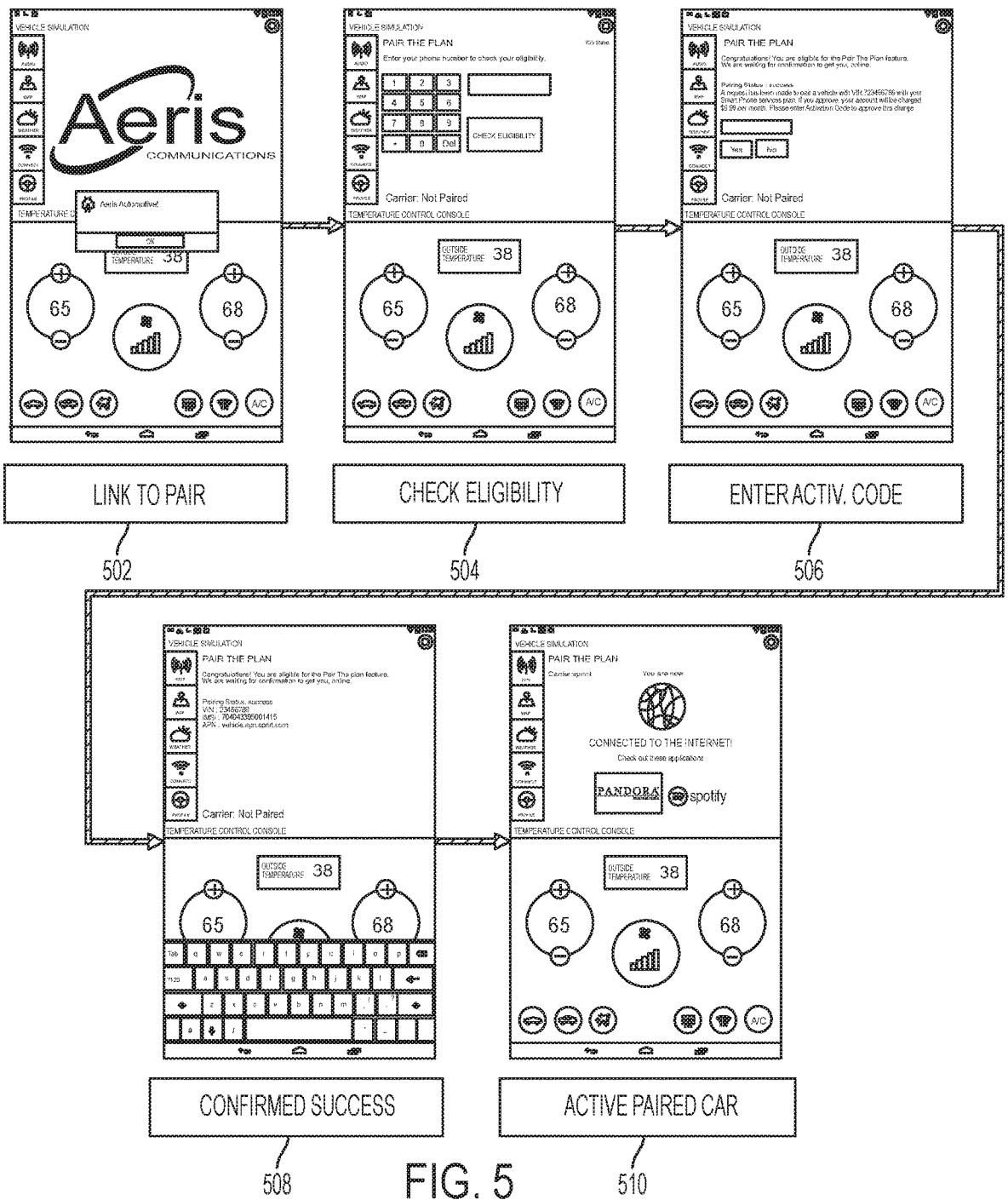
FIG. 5 illustrates a series of display screens depicting an example of a vehicle pairing experience by a vehicle owner.

FIG. 5 illustrates a series of display screens depicting an example of a pairing experience by the consumer, in accordance with an embodiment of the invention. Initially, the consumer will go to a "Vehicle Subscription Pairing" screen 502 accessible via user settings. The consumer must enter an identification number, for example, a phone number of the primary device, typically a smartphone, associated with his/her cellular subscription using a keypad or other input system similar to that on screen 504. An application based on a server or in the cloud will be triggered that will use the entered phone number to identify the consumer's cellular network provider and subscription. Once the plan is identified, the eligibility of the subscription plan to support pairing with the vehicle is verified. If eligible, a request requiring verification that the consumer approves adding the vehicle to their identified plan as a new device is sent to the consumer. In this embodiment, the verification process is entering an activation code on screen 506.

After successful verification by the consumer, a request is sent to the consumer's cellular network provider to obtain new values of network resources for the vehicle's telematics unit. These resources include, but are not limited to, the IMSI, Mobile Subscriber Integrated Services Digital Network-Number (MSISDN), and the APN to be used as APN2 308 in FIG. 3.

Thereafter the consumer's cellular network provider will respond to the request with new resource values. An over-the-air update to the vehicle is performed applying the resource values obtained from the consumer's carrier. A confirmation text is then sent to the consumer's smartphone. Upon completion, additional message(s) may be provided confirming that pairing has completed and/or reporting any pairing errors as shown by screen 508 and screen 510.

Figure 6A:
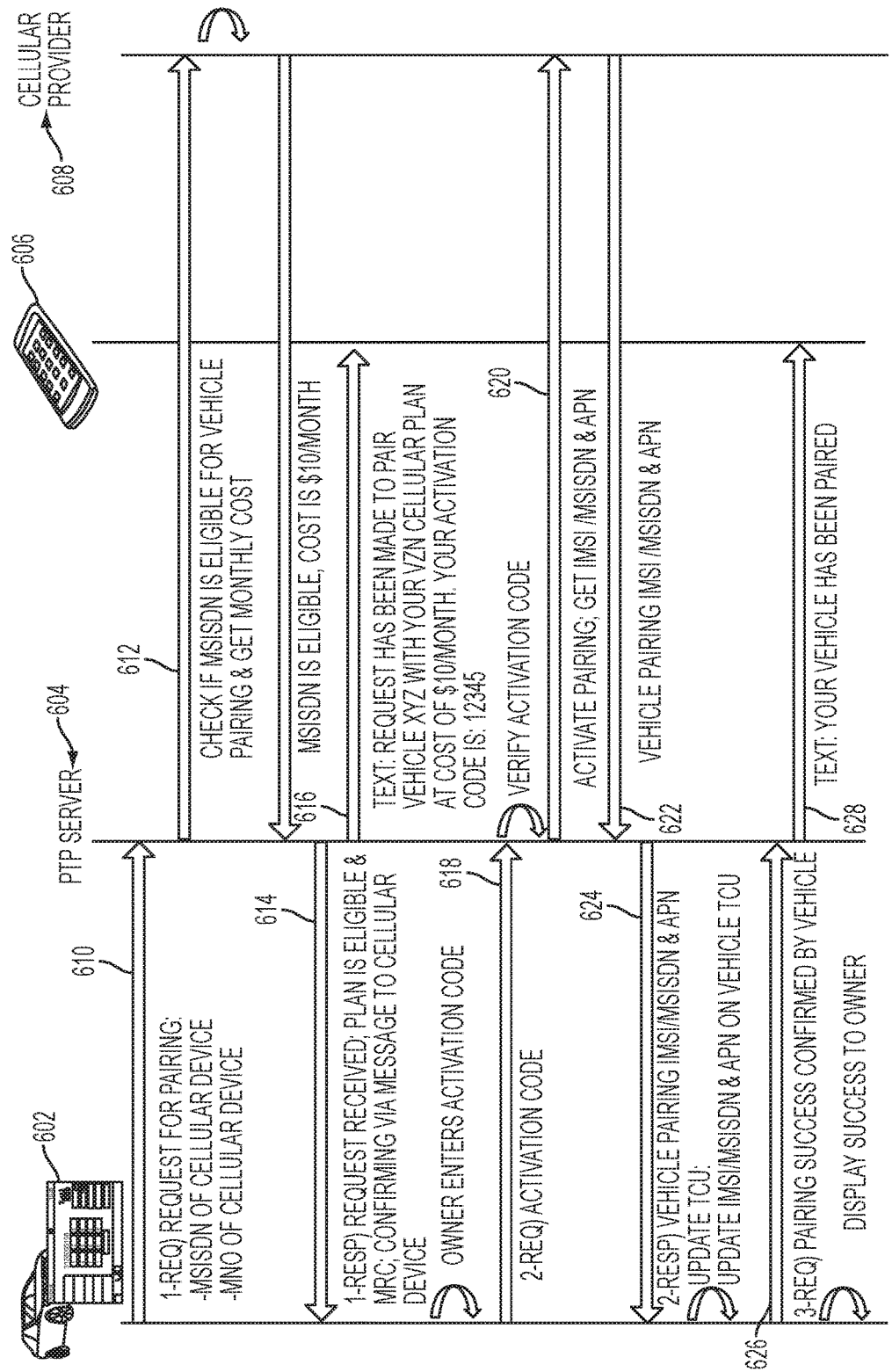
FIG. 6a is a process flow diagram illustrating one way in which the multiple-purpose device (in this case, in a vehicle) can be paired to cellular device subscription of the consumer using the solution embedded in the device.

FIG. 6a is a flow diagram illustrating the process of pairing the vehicle to the billing plan of the consumer's cellular subscription, in accordance with an embodiment of the invention. The consumer's cellular network provider is referred to as "Cellular Provider," 608 and the server or cloud-based application is referred to as the "PTP server" 604.

First, a request for pairing is initiated by the consumer to the PTP server 604 via step 610. This initiation could be provided in a variety of ways. For example, one, by providing either an MSISDN of a cellular device 606 of the vehicle owner and thus identifying MNO based on MSISDN, or two, by providing a MNO of the cellular device 606 of the consumer. Next, the PTP server 604 sends a signal to the cellular provider 608 to determine if the cellular device 606 is eligible for vehicle pairing by the cellular plan provider 608, by utilizing for example the MSISDN, via step 612. If it is determined that the cellular device 606 is eligible, then a monthly cost may be provided to the PTP server 604 and sent to the vehicle 602, via step 614. Next, a text is provided to the cellular device to prevent fraud and make sure the user actually has possession of the cellular device, via step 616. The text may say for example "Request has been made to pair vehicle XYZ with your VZN mobile plan at cost of $10/month. If you wish to accept pairing, press <here>. We will then send you an activation code to complete this transaction." Upon receipt of the approval, the cellular plan provider may send an additional text to indicate completion of the enrollment process, saying, for example, "Your activation code is: 12345". Next, the consumer would enter the activation code, via step 618, to finish the pairing activities by the consumer.

Pairing is then activated, for example, by obtaining the appropriate IMSI/MSISDN and the access point name (APN) from the cellular plan provider, via step 620. The vehicle is paired utilizing the IMSI/MSISDN and APN and a notification is displayed as "Vehicle pairing IMSI/MSISDN and APN", via step 622. Pairing success may then be confirmed by vehicle, via step 624. Finally, the vehicle screen will display pairing success to the owner of the cellular device, via step 626 and a text is received by the cellular device that indicates that the vehicle has been paired, via step 628. Thereafter, the cellular device used to perform the pairing is not required to be present in the vehicle for the consumer-oriented services to be usable.

Figure 6B:
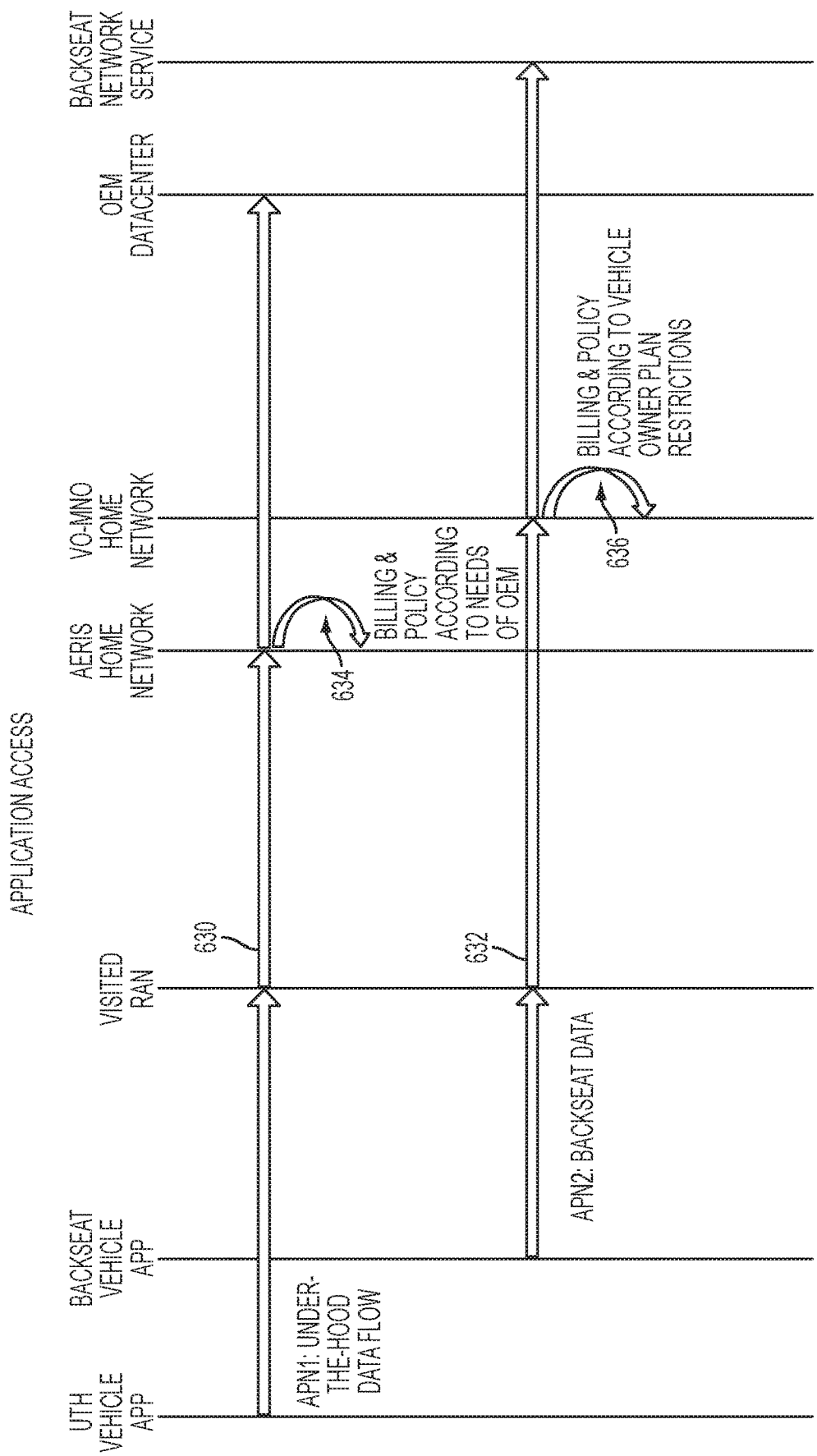
FIG. 6b is a flow diagram illustrating an example of different ways in which data may flow according to the policies of the user plans with which the device is paired.

FIG. 6b illustrates the transmittal of information to and from the paired vehicle device through two corresponding network traffic paths identified by the access point name (APN). Each path manages and charges for traffic according to the policies and the billing plan selected by corresponding stakeholder. For example, as shown in FIG. 6b, APN1 provides under-the-hood and other driving-related data to the OEM step 630 and APN2 provides consumer-directed infotainment or other services to the consumer step 632.

Since the OEM is interested in monitoring under-the-hood and other driving-related data, the OEM will be charged for network traffic associated with transmitting this data, according to its billing plan step 634. Similarly, since the consumer is interested in receiving infotainment or other consumer-directed services and associated content, the consumer will be charged for traffic associated with these consumer-directed applications according to the rules and policies of the consumer's cellular subscription and associated billing plan step 636.

Figure 7A:
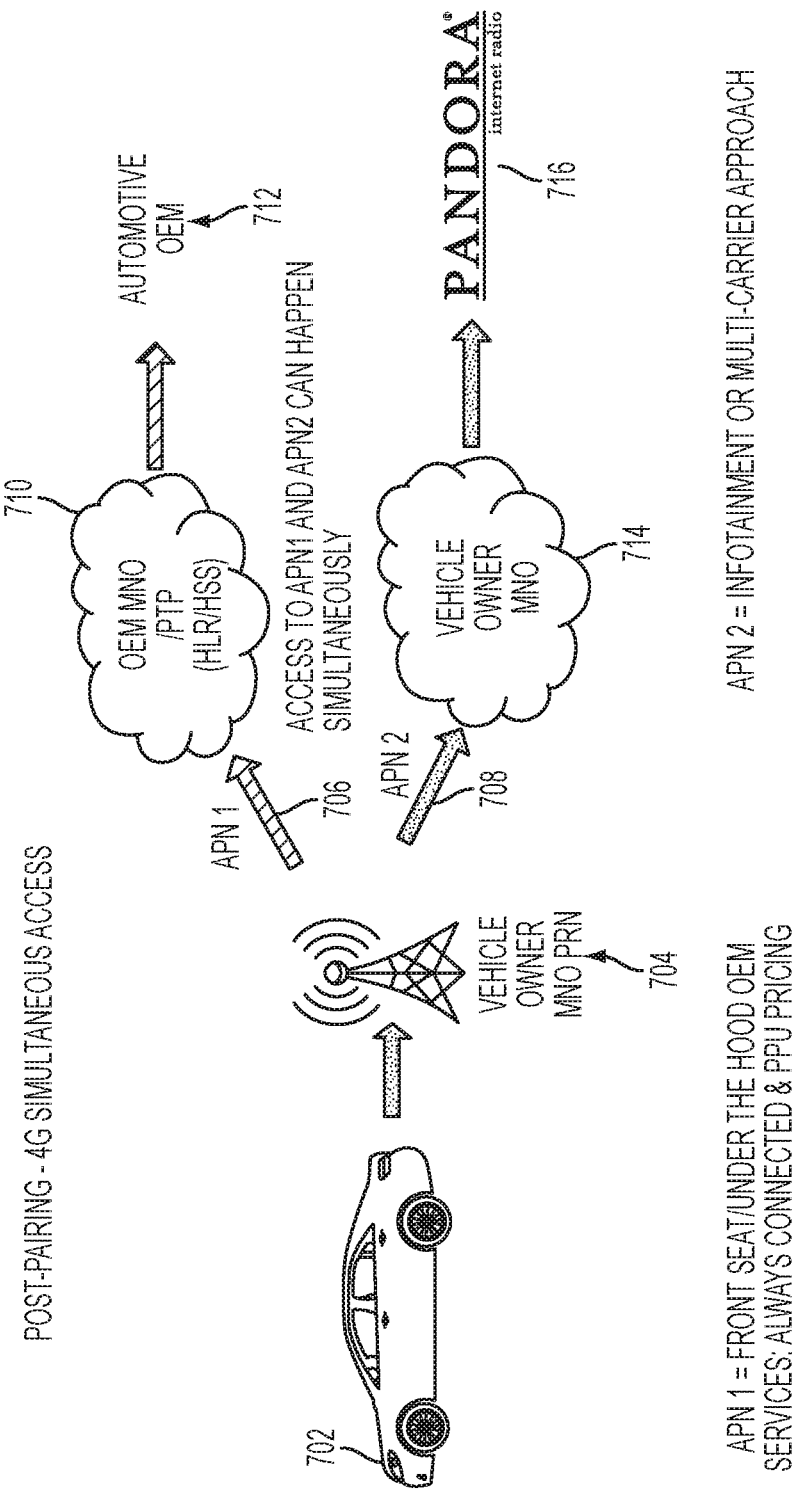
FIG. 7a illustrates a way in which a device being used for enterprise and consumer purposes simultaneously may access different provider networks, in this case through use of different access point names (APN1 and APN2) via a fourth generation (4G) cellular systems network.

FIG. 7a illustrates simultaneous access through APN1 and APN2 via a first cellular network system, for example, a fourth generation (4G) network. The simultaneous access through both APN1 706 and APN2 708 is possible due to the presence and simultaneous availability of two data paths in a 4G network system, identified by APNs 706 and 708 (APN1 and APN2).

Figure 7B:
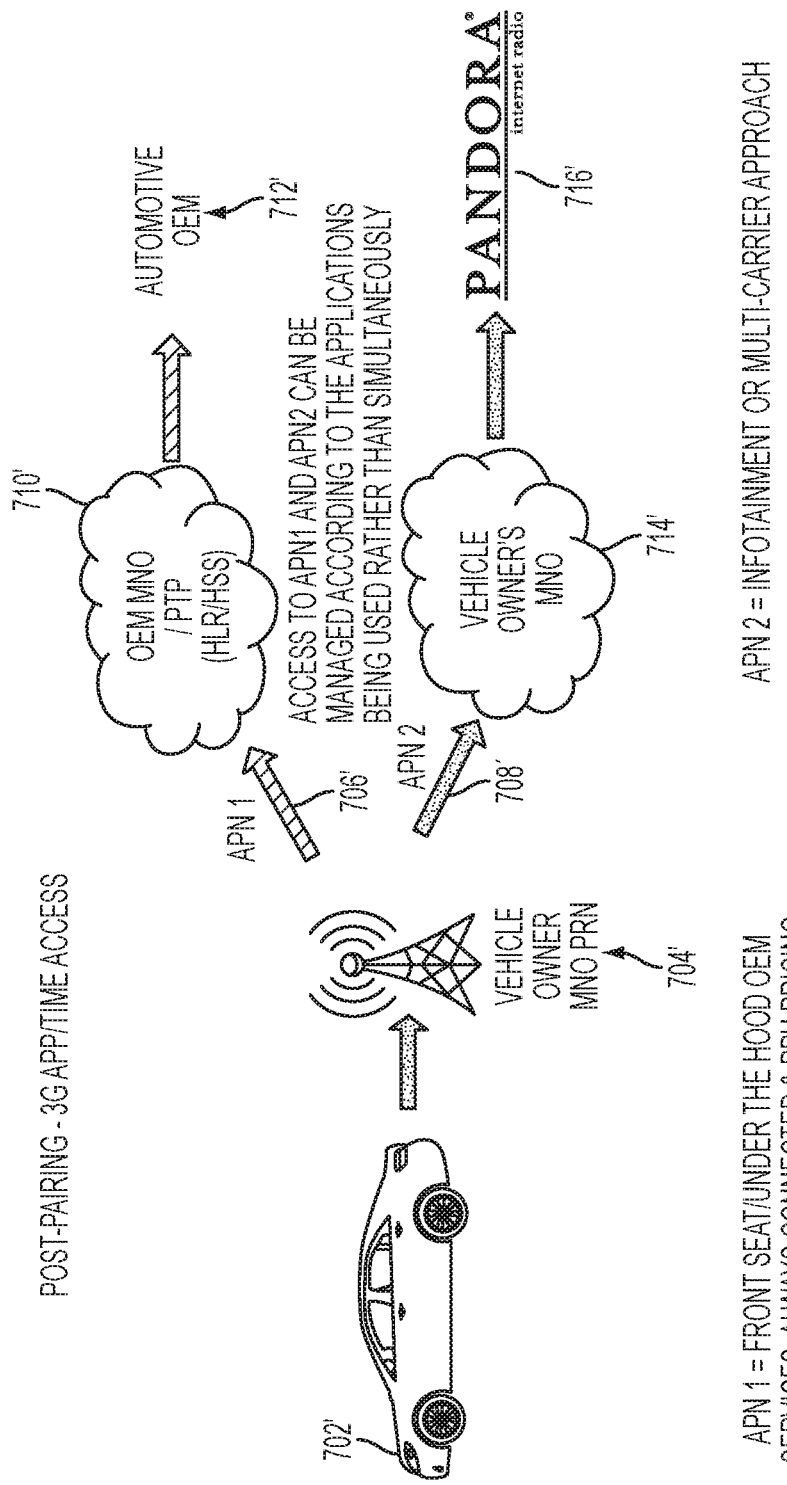
FIG. 7b illustrates alternate access through Access Point Name 1 (APN1) and Access Point Name 2 (APN2) via a third generation (3G) cellular systems network.

FIG. 7b illustrates alternate access through APN1 and APN2 via a second cellular network system, for example, a third generation (3G) network. In a 3G network system, only one data path is accessible at a time, so the vehicle 702' must be able to alternate between the two data paths identified by APN1 706' and APN2 708' according to the priorities and requirements of the supported applications. Different algorithms can be used for determination of APN access by the vehicle during different situations. For example, the algorithm could specify "if the vehicle is not in "ignition/aux on" then use APN1; if the vehicle is in "ignition/aux on" then use APN2". The use of this algorithm can result in the OEM accessing its under-the-hood data via APN1 706' when the vehicle 702' is not being used by the consumer, and the consumer accessing its applications and data via APN2 708'. This arrangement generally works well since many OEM uses for data are not time-specific, allowing OEM 712' to upload its under-the-hood data just after the vehicle 702' is turned off. However, the system can be configured to grant priority to non-consumer uses in specified situations, such as in case of emergency; for example, the system can immediately grant access to emergency communication, such as an automatic call to 911 regarding an accident, by switching to APN1 706' and terminating communications over APN2 708' for the duration of the emergency call.

Figure 8:
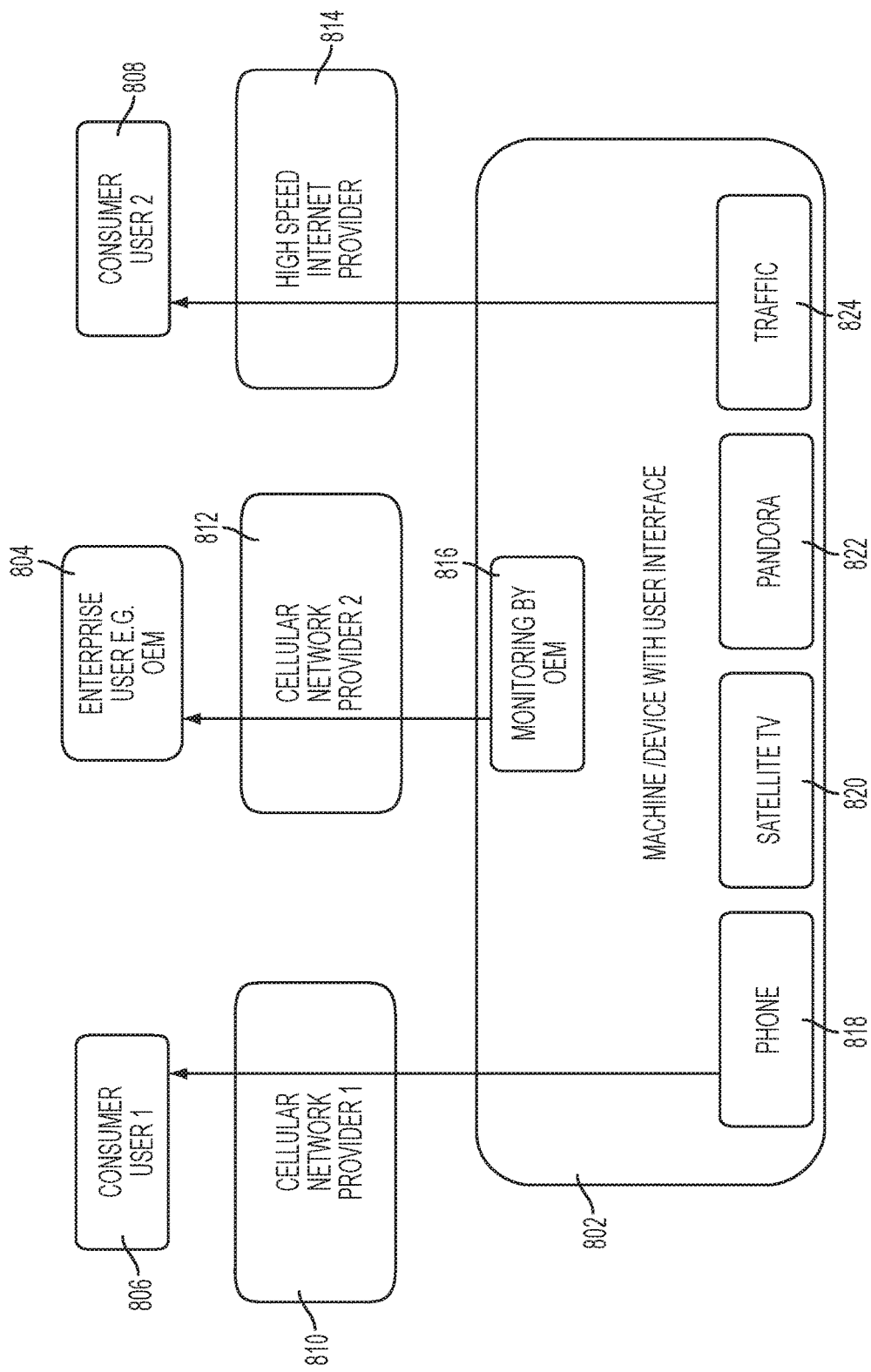
FIG. 8 illustrates an example of an interface for use/purpose based billing for multipurpose devices connected to multiple service providers providing different data services to different users in accordance with an embodiment.

FIG. 8 illustrates another embodiment where, in independent transactions, a device such as a tablet or a vehicle is enrolled in one or more billing plans chosen by one or more enterprise stakeholders and also in one or more billing plans chosen by one or more consumers, such as but not limited to an owner, user or a lessee of the tablet or the vehicle. Device 802 can be any device such as but not limited to a tablet or a vehicle with a user interface for example, as described in FIG. 5. Enrolling the device 802 in different subscription plans as selected by different users, which can be any combination of one or more enterprises and/or consumers, is carried out as described in FIG. 6a. Examples used are for purpose of illustration only, and should not be construed as limitations.

As illustrated in FIG. 8, OEM 804 is an enterprise that is interested in monitoring equipment performance 816, enrolls device 802 in the service provider subscription plan 812 selected by OEM 804. Consumer1 806 and consumer2 808 are different users of the same device 802 who, in addition to using the device for its principal purposes (e.g. in case of vehicle, driving), would also use the device 802 for other purposes such as infotainment depicted by phone 818, satellite TV 820, Pandora 822 and traffic 824. When consumer1 806 uses the device 802 for his/her own purpose such as infotainment, he/she would use his/her own subscription plan. Consumer1 806 enrolls device 802 in the service provider subscription plan 810 selected by consumer1 806. Similarly, when consumer2 808 uses the device 802 for his/her own purpose such as infotainment, he/she would use his/her own subscription plan.

Consumer2 808 enrolls device 802 in the service provider subscription plan 814 selected by consumer2 808. Furthermore, consumer1 806 and consumer2 808 can choose which channel to use to get the content based on their service provider subscription plan. For example, applications available through different communication channels, consumer can choose which communication channel to use e.g. YouTube through cellular network as a communication channel is more expensive than internet as a communication channel.

Figure 9:
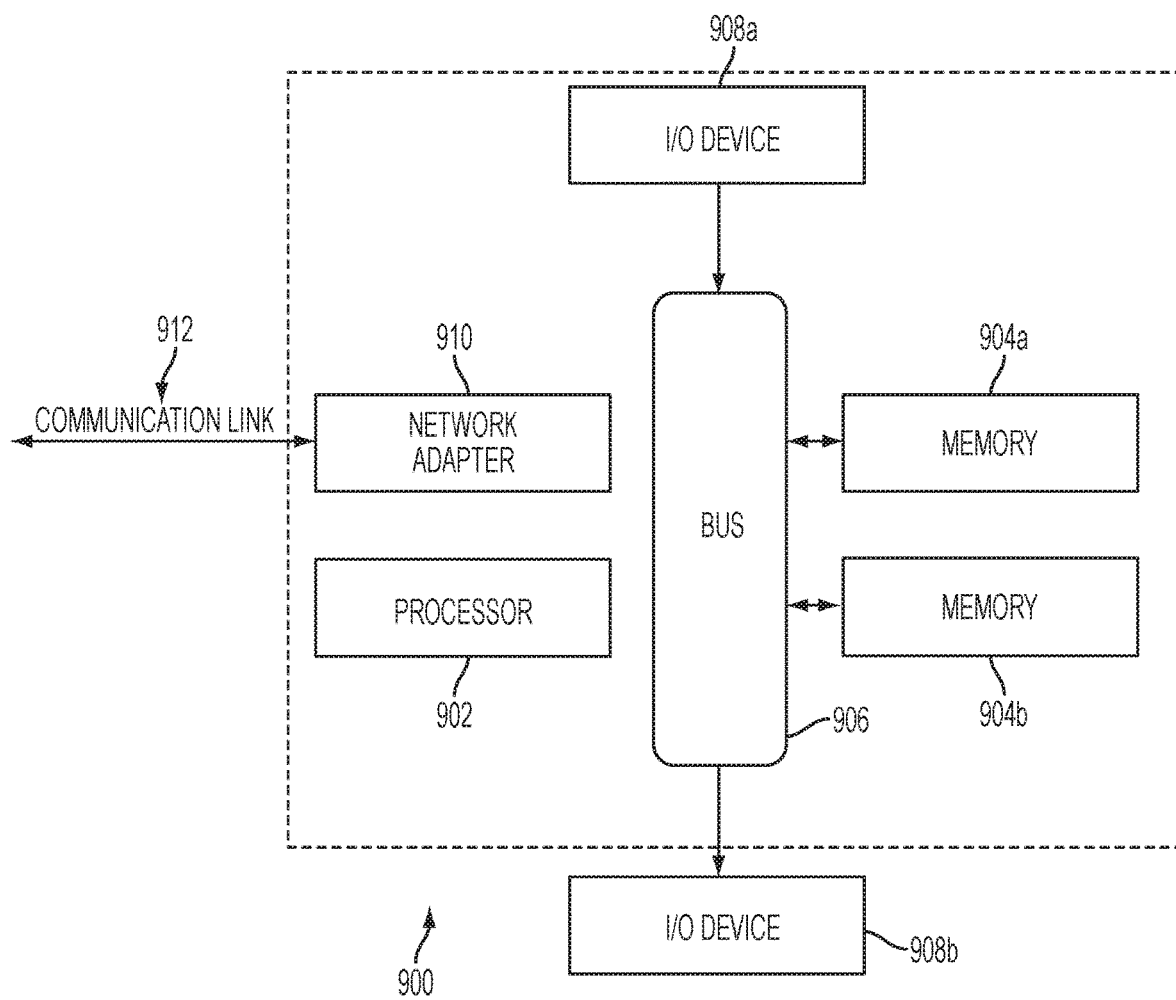
FIG. 9 illustrates a data processing system 900 suitable for storing the computer program product and/or executing program code relating to the choices of the users in accordance with an embodiment of the present invention.

FIG. 9 illustrates a data processing system 900 suitable for storing the computer program product and/or executing program code in accordance with an embodiment of the present invention. The data processing system 900 includes a processor 902 coupled to memory elements 904*a-b* through a system bus 906. In other embodiments, the data processing system 900 may include more than one processor and each processor may be coupled directly or indirectly to one or more memory elements through a system bus.

Memory elements 904*a-b* can include local memory employed during actual execution of the program code, bulk storage, and cache memories that provide temporary storage of at least some program code in order to reduce the number of times the code must be retrieved from bulk storage during execution. As shown, input/output or I/O devices 908*a-b* (including, but not limited to, keyboards, displays, pointing devices, etc.) are coupled to the data processing system 900. I/O devices 908*a-b* may be coupled to the data processing system 900 directly or indirectly through intervening I/O controllers (not shown).

In FIG. 9, a network adapter 910 is coupled to the data processing system 902 to enable data processing system 902 to become coupled to other data processing systems or remote printers or storage devices through communication link 912. Communication link 912 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include digital versatile disk (DVD), compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Similarly, it is envisioned by the present invention that the term communications network includes communications across a network (such as that of a M2M but not limited thereto) using one or more communication architectures, methods, and networks, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), fourth generation cellular systems (4G) LTE, wireless local area network (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:
1. A computer-implemented system comprising:
a processor, and
a memory in communication with the processor wherein the memory containing program instructions which when executed by the processor, perform the following operations comprising:

enrolling a multipurpose device enabled for connectivity to cellular or other wireless service in at least one cellular or other wireless service subscription and billing plan of at least one network service provider as any other cellular or wireless device used by a second user; wherein the enrollment includes providing an identifier of the enabled multipurpose device to the at least one network service provider, effectively adding the enabled multipurpose device to the at least one cellular or other wireless service subscription and billing plan chosen by the second user;

wherein usage of characteristics of interest to a first user of the multipurpose device are governed by the at least one cellular or other wireless service subscription and billing plan through a network service provider chosen by the second user, and wherein usage of characteristics of interest to the second user of the multipurpose device are governed by the at least one cellular or other wireless service subscription and billing plan through a network service provider chosen by the second user, wherein the multipurpose device is shared simultaneously by the first user and the second user for the usage of characteristics of interest of each user, wherein the first user is an enterprise user and the usage characteristics of interest to the first user comprise enterprise applications and purposes, and wherein the second user is a consumer user and the usage characteristics of interest to the second user comprise consumer applications and purposes.

2. The computer-implemented system of claim 1, wherein the network service provider chosen by the first user is the same as the network service provider chosen by the second user.

3. The computer-implemented system of claim 1, further comprising program instructions for:

managing data flow through one or more data paths according to usage requirements by the first user and the second user.

4. The computer-implemented system of claim 1, further comprising program instructions for:

managing data flow through one or more data paths according to connectivity parameters controlled by the data service provider and the device, and according to usage requirements by the first user and the second user.

5. The computer-implemented system of claim 1, wherein the one or more users comprise any of enterprise, consumer and a combination thereof.

6. The computer-implemented system of claim 1, wherein the network service provider comprises any of cellular service provider, internet service provider and a combination thereof.

7. The computer-implemented system of claim 1, wherein the device identifier comprises any of international mobile subscriber identification (IMSI), mobile directory number (MDN), mobile subscriber integrated services digital network number (MSISDN) and a combination thereof.

* * * * *